Oct. 4, 1966    J. A. BOLT    3,276,208
METHOD OF FORMING A SUBTERRANEAN ASPHALTIC WATER BARRIER
Filed July 28, 1965
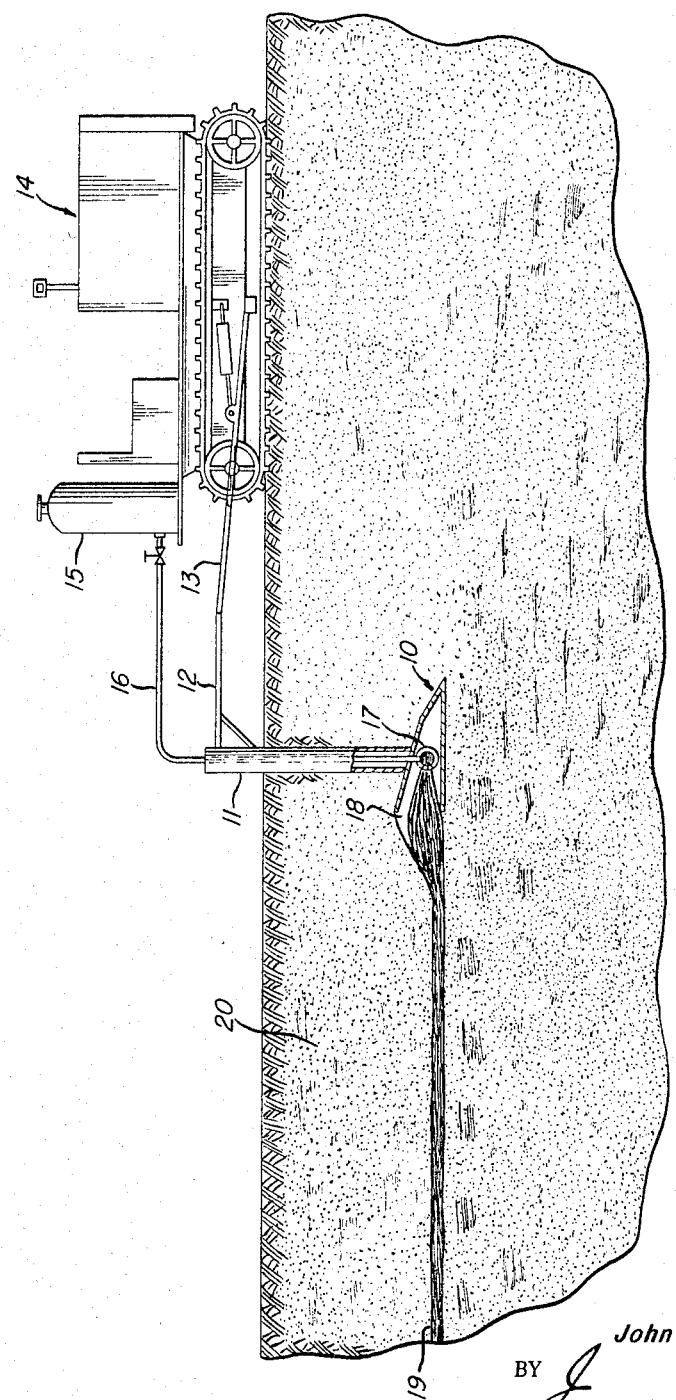
INVENTOR.
John A. Bolt
BY
*Eugene S. Coddon*
ATTORNEY

United States Patent Office 3,276,208
Patented Oct. 4, 1966

3,276,208
METHOD OF FORMING A SUBTERRANEAN ASPHALTIC WATER BARRIER
John A. Bolt, Chicago, Ill., assignor to Standard Oil Company, Chicago, Ill., a corporation of Indiana
Filed July 28, 1965, Ser. No. 477,650
5 Claims. (Cl. 61—1)

This is a continuation-in-part of application Serial No. 198,090, filed May 28, 1962, now abandoned.

This invention relates to the control of water migration in soils. More particularly, it relates to a method of forming a subterranean asphaltic water barrier in situ in a preselected subsurface stratum of soil in a plane substantially parallel to and coextensive with the soil surface to establish an artificial water table and control the downward percolation of water in porous soils; and also to control the upward migration of water in soils.

Large areas of land are located in arid and semi-arid areas of the world where due to the porosity of the soil, insufficient water is retained in the plant root zone to make such land suitable for agricultural or grazing purposes. As the population of the world continues to grow, need for using this marginal land for agricultural purposes becomes more pressing. Formerly it was believed that this type of marginal land could not compete with the more fertile land and thus such marginal property was unsuitable for agricultural purposes. In many areas good agricultural land is becoming sufficiently scarce so as to create a need for economical and easily applied methods for reclaiming sandy and other porous soils which lack sufficient water retention properties for agricultural purposes.

The upward migration of subsurface moisture is an ever present problem in many soils. For example, such moisture is extremely damaging to roads in temperate zones where alternate freezing and thawing produces frost boils and subsequent road destruction. This problem is especially acute in plastic or clayey soils where adequate drainage cannot be effected.

I have discovered that asphaltic material can be used to form a subterranean water barrier to hold sufficient surface water in the plant root zone of sandy soil to make such sandy said suitable for agricultural purposes. Contrary to what has been previously believed, asphaltic material is not harmful to plant growth. It is essential that the water barrier be in the lower portion of the root zone and be both easily and economically formed in situ in existing marginal lands.

The method of the present invention for forming a subterranean asphaltic water barrier in situ in a preselected subsurface stratum of soil and in a plane substantially parallel to and coextensive with the soil surface, comprises the steps of forming a translating cavity in a preselected subsurface stratum of soil in a plane substantially parallel with the soil surface without significantly disrupting the structure of the soid surface, said cavity having the bottom surface thereof in a plane substantially parallel with the soil surface; spraying onto said bottom surface an aqueous asphaltic emulsion which quickly breaks and sets to form a continuous water impermeable flexible asphalt membrane on the bottom surface of said cavity prior to closing of said cavity; and thereafter closing said cavity to thereby form in said subsurface stratum of soil an asphaltic water barrier in a plane substantially parallel to and coextensive with the soil surface. I have found that such a water barrier can be formed by the use of subterranean apparatus, such as subterranean plow, together with a suitable mechanism for injecting flowable asphaltic material into the translating subterranean cavity formed as the plow moves forward.

In the practice of my invention the subterranean apparatus suitable for forming the asphaltic water barrier is attached to a tractor or other mechanism for pulling the apparatus forward. Suitable containers, which may be pressurized, are carried above the surface along with the plow with connections for injecting the asphaltic material into the translating subterranean cavity formed by the subterranean apparatus. Since one usefulness of my invention is enhancing the grass growth on sandy-soil range lands, it is desirable to have only minimum disturbances of the surface and root zone soil so that the growth of the plants may continue. Additionally, it requires excessive power to draw the subterranean plow if the surface and root zone are materially disturbed. The minimum cross-sectional area should be exposed in the forward motion of the plow.

Conventional aqueous asphalt emulsions which are suitable for use in this invention can be either cationic (acidic) or anionic (basic), although cationic emulsions are preferred. It has been found that the use of the "rapid set" type of emulsions, which are well known to the art, is essential to the formation of satisfactory subterranean asphalt water barriers in accordance with this invention. The "rapid set" emulsions are of the type that can quickly break and set to a continuous asphalt film upon application. The formation of these emulsions is well known to the art. Suitable emulsions for use at ambient temperatures consist essentially of 55–70 weight percent of an asphalt having a penetration of about 60–300, preferably 150–200, at 77° F., an amount of emulsifying agent, cationic or anionic, sufficient to form a "rapid set" emulsion, about 0.05 to 0.75 weight percent; and the balance, water. Suitable emulsifying agents for use in preparing these emulsions include primary, secondary, tertiary, and polyamine salts as cationic emulsifiers; and alkali metal salts of fatty acids as anionic emulsifiers. These salts are usually formed in the aqueous emulsifying solution by the reaction of the amine with an acid such as hydrochloric, and the fatty acid with a base such as sodium hydroxide. These emulsions can be made so that they are stable for storage and transportation yet will rapidly break when applied. It is essential that the emulsion be broken and the continuous asphalt film be formed on the bottom surface of the cavity prior to the closing of the cavity otherwise a discontinuous barrier is formed. Well known coagulating agents or electrolytes can be employed to aid in the breaking of the emulsions in the cavity. Such agents as ammonia, sulfur dioxide, carbon dioxide, hydrogen chloride, or chlorine can be used as gases or gaseous solutions thereof which are concurrently introduced with the aqueous asphalt emulsions into the translating cavity.

In the attached drawing is shown apparatus useful in the method of injecting the asphaltic material into the subterranean cavity to form the essentially continuous water barrier of asphalt. Wedge-shaped subterranean plow 10 is attached to shank 11 which, in turn, is attached to drawing mechanism 12 and draw bar 13. Tractor 14 carries container 15 in which is stored the asphalt emulsion being deposited in subterranean cavity 18. As the subterranean plow 10 is moved forward by tractor 14, the translating subterranean cavity 18 having the bottom surface thereof in a plane substantially parallel with the soil surface is formed and the asphalt emulsion is sprayed onto the bottom surface of subterranean cavity 18 by means of valved conduit 16 and distributor 17. The emulsion is broken and forms continuous asphaltic water barrier 19 prior to closing the cavity. It is necessary that the barrier 19 be essentially continuous so as to hold any surface water percolating from the surface or migrating upward. While it should be appreciated that it may not be possible to eliminate all openings in barrier 19, it is highly desirable to reduce such openings to a minimum. It has been found that in laying the barrier, an overlap should be provided during each successive sweep so as to essentially eliminate channel openings between sweeps. For agricultural purposes, the barrier should be deep enough to permit cultivation of the root zone without disturbing barrier 19. However, barrier 19 should not be so deep that the roots of the plants will not be nourished by the water trapped by such barrier. The depth of the barrier below the surface will vary with the type of plant being grown in the root zone. Usually from 20 to 36 inches will be found satisfactory.

To determine whether such a subterranean asphaltic barrier as described above would be toxic to plant growth, a number of greenhouse experiments were carried out wherein asphaltic layers were placed in soil boxes at varying depths from 4 to 20 inches. Potatoes were selected as the experimental plant since they are well known for high toxic susceptibilty. The potato plants were permitted to grow and were examined after two months' growth. These plants showed no root or plant damage as compared with the control plants in the soil boxes not containing asphalt barriers. It was concluded that no toxic effect on the plants would be experienced when they were grown in soils having subterranean barriers of asphaltic materials.

Field tests were carried out on Grayling sand in Kalkaska County, Michigan. The experimental plot sizes were 20 x 120 feet. A subterranean plow, a wedge-shaped device having a distributor for injecting asphalt emulsion into the subterranean cavity formed by the wedge as the plow is drawn forward, was used to form a 32-inch wide continuous strip of asphaltic material during each sweep. The barriers were laid at a depth of 24 inches on 27-inch centers. Successive sweeps were made side by side allowing a five-inch overlap thus forming an essentially continuous barrier. The plow was drawn forward by tractor at the speed of about 1.14 miles per hour. In two test plots asphalt emulsion was applied at the rate of 59 ml. per square foot. For control purposes there were two plots with no barriers. No difficulty was experienced in delivering the asphalt emulsion to the subterranean cavity in forming the water barrier. The disturbance of the soil or sod on the surface and in the root zone was held at a minimum. The plots containing the asphalt barriers and the control plots with no asphalt barriers were plowed two weeks after laying the barrier and planted in winter wheat.

Three weeks after the asphalt barriers were laid in the above experimental plots, exploratory holes were dug in representative locations on the plots to examine the asphalt barriers. In each case it was found that the asphalt barrier was sufficient to retard drainage of surface water.

In accordance with this invention a subterranean asphalt water barrier was also installed in a one-acre test plot in said Grayling sand. An aqeuous cationic asphalt emulsion containing of about 65 weight percent asphalt having a penetration of about 150–200 at 77° F., about 0.2 weight percent N-tallow-1,3-propylene diamine and about 0.1 weight percent concentrated hydrochloric acid to form the amine hydrochloride as emulsifying agent, about 0.1 weight percent calcium chloride as emulsion stabilizer, and the balance, water, was prepared. This emulsion was applied at a rate of about 1,800 gallons per acre, at a tractor speed of about 138 feet per minute, at a nozzle pressure of 14–16 p.s.i., and at a depth of 24 inches on 27-inch centers with a ploy having a width of 34 inches, length of 32 inches, and a height of 5". Spray orifices were about 3.5 inches from the bottom surface of the cavity. The length of each continuous asphalt strip was about 200 feet. Sufficient overlap of the successive sweeps was obtained to form a substantially continuous subterranean asphalt barrier in a plane parallel to and coextensive with the surface area. Exploratory holes dug in representative locations in the test and adjacent soil areas showed that a continuous asphalt membrane having an average thickness of about ⅛ inch was formed and an artificial water table established throughout the test area.

Other applications will be readily apparent to those skilled in the art for utilizing the method of this invention to form monolithic subterranean asphalt water barriers in situ to control the upward and downward migration of water in soils. It is particularly suitable for forming effective subsurface water barriers in roads built over plastic subgrades having a constant moisture content and thereby prevent upwards intrusion of water through capillarity into the road bed.

I claim:
1. The method of forming a subterranean asphaltic water barrier in situ in a preselected subsurface stratum of soil and in a plane substantially parallel to and coextensive with the soil surface, which comprises the steps of:
   (a) forming a translating cavity in a preselected subsurface stratum of soil in a plane substantially parallel with the soil surface without significantly disrupting the structure of the soil surface, said cavity having the bottom surface thereof in a plane substantially parallel with the soil surface,
   (b) spraying onto said bottom surface an aqueous asphaltic emulsion which quickly breaks and sets to form a continuous water impermeable flexible asphalt membrane on the bottom surface of said cavity prior to closing of said cavity; and
   (c) thereafter closing said cavity to thereby form in said subsurface stratum of soil an asphaltic water barrier in a plane substantially parallel to and coextensive with the soil surface.
2. The method of claim 1 wherein said asphaltic emulsion consists essentially of 55–70 weight percent asphalt having a penetration of about 60–300 at 77° F., an emulsifying agent, and the balance, water.
3. The method of claim 2 wherein said emulsifying agent is anionic.
4. The method of claim 2 wherein said emulsifying agent is cationic.
5. The method of claim 4 wherein said asphalt has a penetration of about 150–200 at 77° F.

References Cited by the Examiner
UNITED STATES PATENTS

| 668,362 | 2/1801 | Tomlinson | 61—13 |
| 1,006,116 | 10/1911 | Morse | 61—72.6 X |

OTHER REFERENCES

U.S. Bureau of Reclamation; U.S. Dept. of Interior; "Canal Linings and Methods of Reducing Costs"; published by U.S. Government Printing Office (Superintendent of Documents), Washington 25, D.C.; pages 23–30.

EARL J. WITMER, *Primary Examiner.*